US011229198B2

(12) United States Patent
Schmidt et al.

(10) Patent No.: US 11,229,198 B2
(45) Date of Patent: Jan. 25, 2022

(54) INSECT CATCHING TOOL

(71) Applicants: Donna L Schmidt, Wauconda, IL (US); Paul R Lindahl, Wauconda, IL (US)

(72) Inventors: Donna L Schmidt, Wauconda, IL (US); Paul R Lindahl, Wauconda, IL (US)

(*) Notice: Subject to any disclaimer, the term of this patent is extended or adjusted under 35 U.S.C. 154(b) by 385 days.

(21) Appl. No.: 16/294,915

(22) Filed: Mar. 6, 2019

(65) Prior Publication Data

US 2019/0274295 A1    Sep. 12, 2019

Related U.S. Application Data

(60) Provisional application No. 62/639,238, filed on Mar. 6, 2018.

(51) Int. Cl.
*A01M 3/04*    (2006.01)
*A01M 1/14*    (2006.01)

(52) U.S. Cl.
CPC .............. *A01M 3/04* (2013.01); *A01M 1/14* (2013.01)

(58) Field of Classification Search
CPC .......... A01M 3/04; A01M 3/022; A01M 1/14; A01M 3/00; A01M 3/02
USPC .......... 43/136, 114, 115, 134, 137; D22/122, D22/124
See application file for complete search history.

(56) References Cited

U.S. PATENT DOCUMENTS

| 78,950 | A | * | 6/1868 | Forbes | A01M 3/02 43/137 |
| 1,116,895 | A | * | 11/1914 | Karschner | A01M 3/022 43/136 |
| 1,154,310 | A | * | 9/1915 | Hemenway | A01M 3/022 43/136 |
| 1,190,165 | A | * | 7/1916 | Hemenway | A01M 3/022 43/136 |
| 1,239,703 | A | * | 9/1917 | Leaman, Jr. | A01M 1/14 43/115 |
| 1,374,539 | A | * | 4/1921 | Wilson | A01M 3/022 43/136 |
| 1,488,145 | A | * | 3/1924 | Bellows | A01M 3/02 43/136 |

(Continued)

FOREIGN PATENT DOCUMENTS

| DE | 2843106 A1 * | 4/1980 | ............ A01M 3/022 |
| DE | 202015106160 U1 * | 11/2015 | .............. A01M 3/04 |

(Continued)

OTHER PUBLICATIONS

Translation of DE 202015106160 (Year: 2015).*
Translation of JP 2000-157137 (Year: 2000).*
Translation of JP 2004-261106 (Year: 2004).*

*Primary Examiner* — Darren W Ark

(57) ABSTRACT

An insect catching tool has a handle, a tool head, and at least one adhesive layer affixed to an adhesive support insert. The handle is rotatably connected to a proximal end of the tool head, and an insert receptacle traverses into a distal end of the tool head. The adhesive support insert is removably and slidably positioned within the insert receptacle, from within which the at least one adhesive layer is exposed, enabling the user to press the at least one adhesive layer onto a surface with a spider or insect present, capturing the creature. The at least one adhesive layer may include a plurality of adhesive sheets stacked atop each other, which can be easily peeled off and disposed of.

9 Claims, 3 Drawing Sheets

(56) References Cited

U.S. PATENT DOCUMENTS

| | | | | |
|---|---|---|---|---|
| 1,802,774 | A | * | 4/1931 | Nixon .................... A01M 1/14 43/136 |
| 1,888,563 | A | * | 11/1932 | Nixon .................... A01M 3/02 43/136 |
| D95,346 | S | * | 4/1935 | Hawkey .................... D22/124 |
| D101,647 | S | * | 10/1936 | Murray .................... D22/124 |
| 2,603,485 | A | * | 7/1952 | Countryman ............ A63H 3/00 472/57 |
| 2,962,836 | A | * | 12/1960 | Samuel ............... A01M 25/004 43/114 |
| 3,449,856 | A | * | 6/1969 | Weaver ................ A01M 3/022 43/136 |
| 4,126,959 | A | * | 11/1978 | Graham ................ A01M 3/022 43/136 |
| D265,225 | S | * | 6/1982 | Oakes .................... D22/124 |
| D266,182 | S | * | 9/1982 | Borer .................... D22/124 |
| D266,689 | S | * | 10/1982 | Seidel .................... D22/124 |
| D271,414 | S | * | 11/1983 | Kroll .................... D22/124 |
| 4,676,022 | A | * | 6/1987 | Wraight ................ A01M 3/022 43/121 |
| 4,815,231 | A | * | 3/1989 | McQueen ............... A01M 1/14 43/114 |
| 4,905,408 | A | * | 3/1990 | Wu ...................... A01M 3/022 43/136 |
| D338,943 | S | * | 8/1993 | Agostinelli ................ D22/122 |
| D339,841 | S | * | 9/1993 | Gelinas ................... D22/122 |
| D342,775 | S | * | 12/1993 | Kuipers ................... D22/122 |
| D344,567 | S | * | 2/1994 | Teeples ................... D22/122 |
| D346,472 | S | * | 4/1994 | Beebe .................... D22/122 |
| D365,868 | S | * | 1/1996 | Cooper ................... D22/122 |
| 5,588,250 | A | * | 12/1996 | Chiba .................... A01M 1/02 43/114 |
| 5,630,290 | A | * | 5/1997 | Wade .................... A01M 3/022 43/136 |
| D425,961 | S | * | 5/2000 | Kemmis ................... D22/122 |
| 6,178,687 | B1 | * | 1/2001 | Frisch .................... A01M 1/14 43/114 |
| D445,341 | S | * | 7/2001 | Dear ..................... D10/6 |
| 6,442,889 | B1 | * | 9/2002 | Lee ..................... A01M 1/14 43/114 |
| D470,908 | S | * | 2/2003 | Kleckauskas ............. D22/124 |
| D479,299 | S | * | 9/2003 | Marciel .................. D22/124 |
| 7,469,501 | B1 | * | 12/2008 | Blum .................... A01M 3/04 43/136 |
| 7,721,486 | B2 | * | 5/2010 | Rosario ................. A01M 3/022 43/136 |
| D618,758 | S | * | 6/2010 | Zvolanek ................ D22/124 |
| 7,856,752 | B1 | * | 12/2010 | Eilersen ............... A01M 23/005 43/114 |
| 8,104,223 | B1 | * | 1/2012 | Rodriguez .............. A01M 1/14 43/115 |
| 8,567,114 | B1 | * | 10/2013 | Drapeau ................. A01M 3/04 43/136 |
| 8,935,877 | B2 | * | 1/2015 | Gotschi ................. A01M 3/04 43/136 |
| 9,179,664 | B2 | * | 11/2015 | Ogilvie ................. A01M 3/002 |
| 2003/0188473 | A1 | * | 10/2003 | Heller ................... A01M 3/02 43/137 |
| 2008/0040967 | A1 | * | 2/2008 | Young ................... A01M 3/04 43/136 |
| 2012/0180380 | A1 | * | 7/2012 | Grant, III .............. A01M 3/04 43/136 |
| 2014/0223804 | A1 | * | 8/2014 | Cornman, Sr. .......... A01M 3/04 43/114 |
| 2018/0184636 | A1 | * | 7/2018 | Yamamoto ............. A01M 3/00 |
| 2018/0295832 | A1 | * | 10/2018 | Chazalet ............... A01M 3/04 |
| 2018/0368384 | A1 | * | 12/2018 | Kim .................... A01M 3/04 |
| 2021/0037805 | A1 | * | 2/2021 | Kim .................... A01M 1/14 |

FOREIGN PATENT DOCUMENTS

| | | | | |
|---|---|---|---|---|
| EP | 3153019 | B1 | * | 9/2018 ............ A01M 3/04 |
| FR | 3081088 | A1 | * | 11/2019 ........... A01M 3/005 |
| GB | 2393893 | A | * | 4/2004 ............ A01M 3/002 |
| GB | 2482906 | A | * | 2/2012 ............. A01M 3/00 |
| JP | 08089150 | A | * | 4/1996 |
| JP | 08275707 | A | * | 10/1996 |
| JP | 2608357 | B2 | * | 5/1997 ............. A01M 3/00 |
| JP | 09205966 | A | * | 8/1997 |
| JP | 09294522 | A | * | 11/1997 |
| JP | 10191866 | A | * | 7/1998 |
| JP | 2000157137 | A | * | 6/2000 |
| JP | 2002119186 | A | * | 4/2002 |
| JP | 2003310130 | A | * | 11/2003 |
| JP | 2004248646 | A | * | 9/2004 |
| JP | 2004261106 | A | * | 9/2004 |
| JP | 2007135576 | A | * | 6/2007 |
| JP | 3138754 | U | * | 1/2008 |
| JP | 2015084768 | A | * | 5/2015 |
| JP | 6026605 | B1 | * | 11/2016 |
| JP | 2017038544 | A | * | 2/2017 |
| JP | 3218897 | U | * | 11/2018 |
| SI | 9300658 | A2 | * | 8/1995 |
| WO | WO-0189296 | A1 | * | 11/2001 ............ A01M 3/02 |
| WO | WO-2004045280 | A2 | * | 6/2004 ............. A01M 3/02 |
| WO | WO-2004060060 | A2 | * | 7/2004 ............ A01M 3/022 |
| WO | WO-2010142719 | A1 | * | 12/2010 ............ A01M 3/02 |

* cited by examiner

INSECT CATCHING TOOL

FIELD OF THE INVENTION

The present invention relates generally to handheld implements. More particularly, the present invention relates to manual insect capture.

BACKGROUND OF THE INVENTION

Individuals have been climbing on chairs, ladders, tables and the like to reach unwanted insects and bugs inside a home for centuries. Oftentimes individuals may get startled from sudden movements of the insect or lose their balance and fall, resulting in injuries both serious and minor. Additionally, many individuals fear bugs that can prove to be deadly. Some are simply terrified or have a phobia of spiders, known as arachnophobia. In such cases, these people do not have a convenient means for getting rid of bugs that have climbed into hard to reach places such as ceilings. The present invention aims to solve the problems associated with getting rid of unwanted insects, primarily spiders, from ceilings and other hard to reach places. The present invention is a sticky pad attached to a custom spider web shaped head with an elongated handle. With this invention, users will not need to stand on any furniture or ladders when getting rid of spiders that have made a home on their ceiling. Users will be able to reach ceilings and high walls with the elongated handle. To get rid of the spider, the user will simply press the sticky pad onto the spider and then peel off the adhesive sticky tape to discard both the sheet and the spider. The user does not touch the spider in any way. Additionally, the custom spider web shaped head will have an adjustable handle to further facilitate trapping spiders onto the adhesive sticky tape.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention

DETAIL DESCRIPTIONS OF THE INVENTION

Figure 1:
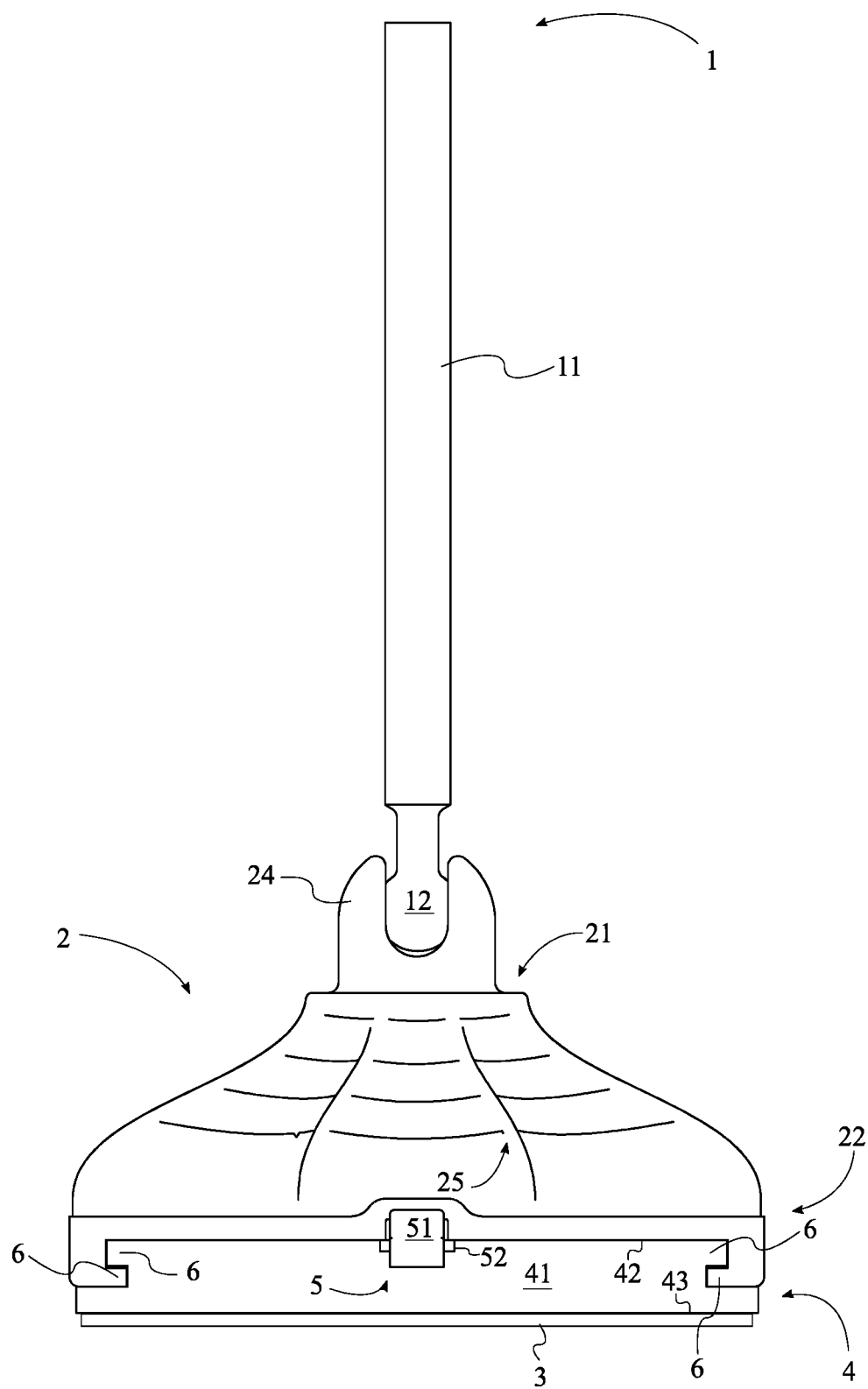
FIG. 1 is a front view of the present invention in accordance with some embodiments.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a hand-held device intended for use in capturing and removing spiders and other insects that are in hard to reach places such as ceilings or high walls in a home. There will be no need to climb onto furniture or ladders to remove spiders using the present invention, eliminating any unnecessary risks such as falling. The present invention is essentially a sticky pad attached to an elongated handle, allowing users to trap spiders onto the pad from a distance. The sticky pad itself will be removably attached to the head of the device. Separate embodiments of the present invention will illustrate the various ways the sticky pad can be removably attached to the device. Preferably, the adhesive sheets used on the sticky pads are much like the adhesive sheets commonly used on lint rollers. The adhesive sheets will be layered onto the sticky pad. In other words, the user simply peels off the top layer and discards it after trapping a spider onto it. Peeling off the top layer will reveal the next adhesive sheet to be used. Each sticky pad will contain a plurality of adhesive sheets. In the preferred embodiment of the present invention, 25 adhesive sheets will come on a sticky pad. The sticky pad is not limited to 25 adhesive sheets and may include more or less depending on what is offered by the manufacturer. Once all the adhesive sheets have been used from a sticky pad, the user will discard the sticky pad and install a new one onto the device. The user will be able to separately buy additional sticky pads for the device. The sticky pad will come with a release liner placed over the adhesive sheets. This will prevent the top adhesive sheet from collecting dust and dirt and allow the user to install the sticky pad without the adhesive sheets from sticking to the user's hand. Prior to use, the user will remove the release liner revealing the first adhesive sheet. After removing the release liner, the user can press the base of the invention onto a spider, using the handle to keep distance. The spider will be stuck to the adhesive pad, which can then be disposed of. The present invention is not limited to just spiders and can be used on a variety of insects and similar creatures.

Figure 2:
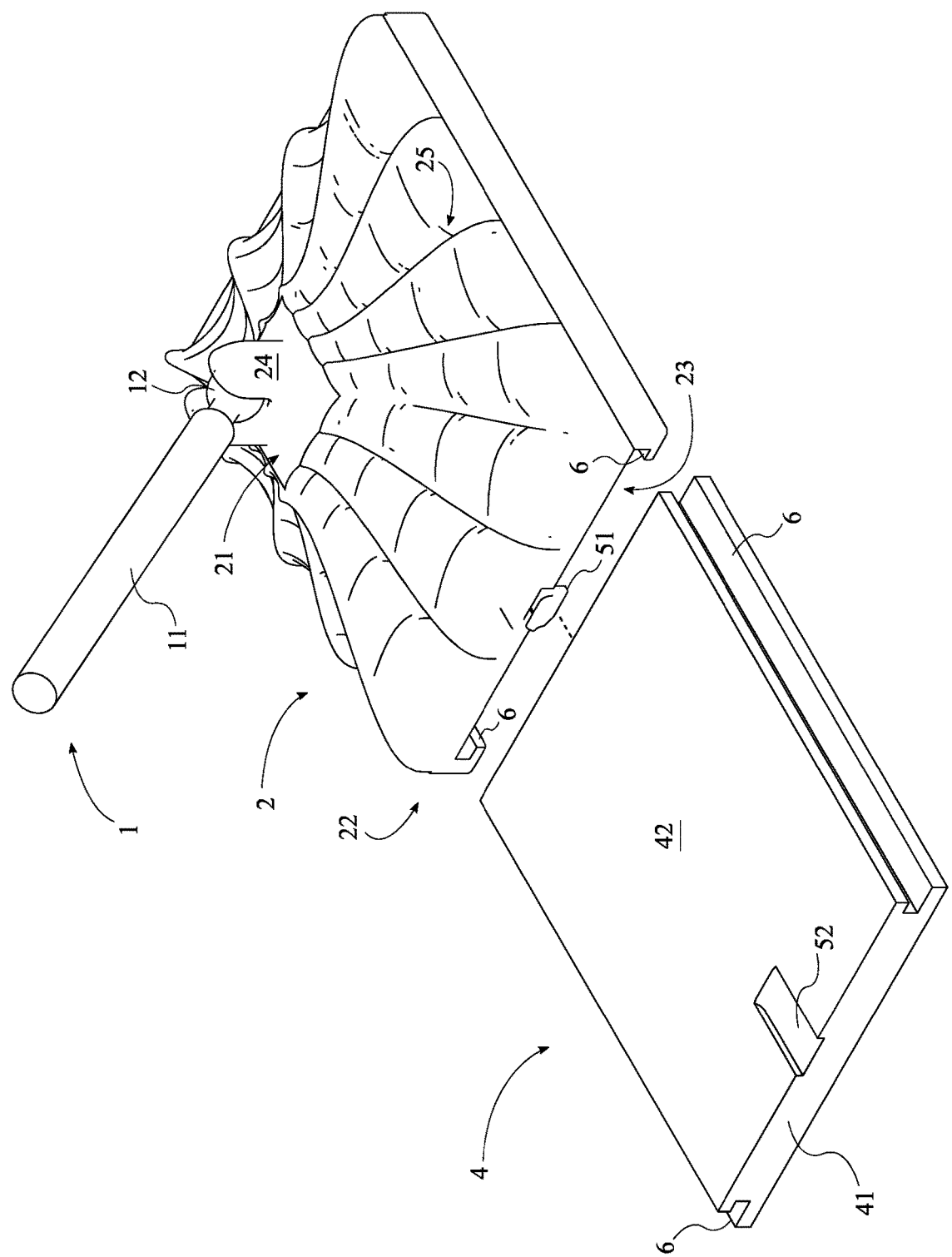
FIG. 2 is a raised perspective view of the present invention with the adhesive support insert removed in accordance with some embodiments.
Figure 3:
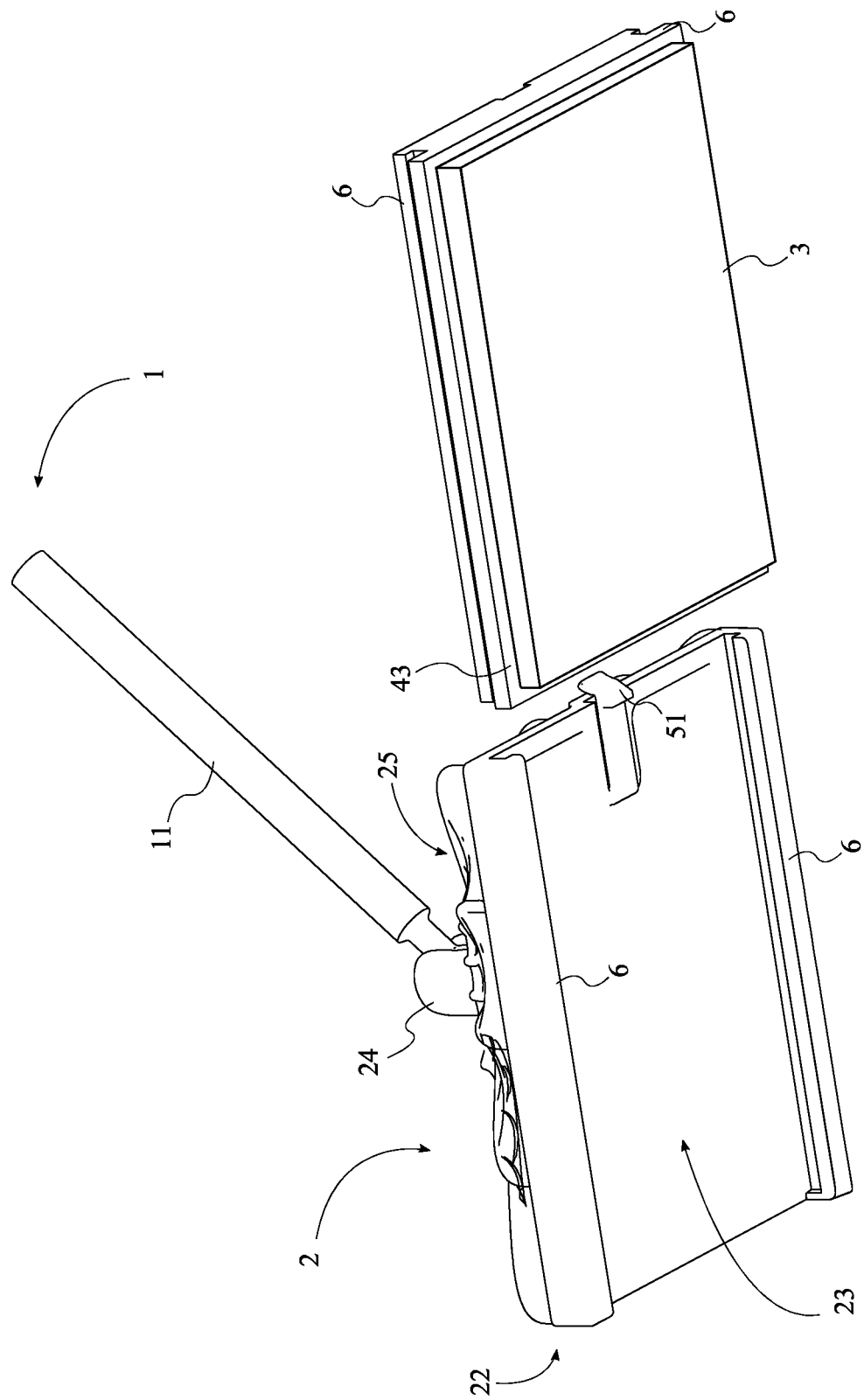
FIG. 3 is a lowered perspective view of the present invention with the adhesive support insert removed in accordance with some embodiments.

Referring to FIGS. 1-3, the preferred embodiment of the insect catching tool of the present invention generally comprises a handle 1, a tool head 2, and at least one adhesive layer 3. The handle 1 is preferably an elongated rod that the user grips in order to manipulate the tool head 2, and thus the at least one adhesive layer 3, into position over a spider or other insect. The overall length of the handle 1 may vary as desired in different embodiments. In some embodiments, the length of the handle 1 may be adjustable, through a telescoping mechanism similar to a paint roller extension pole, or through any other relevant means. The tool head 2 is the main component of the present invention that acts as a structural connection between the handle 1 and the at least one adhesive layer 3. The handle 1 and the tool head 2 may be constructed from any suitable material, such as, but not limited to, various metals, plastics, or wood.

In the preferred embodiment, the tool head 2 comprises an insert receptacle 23, a proximal end 21 and a distal end 22. The tool head 2 extends between the proximal end 21 and the distal end 22, preferably having a generally dome-like shape, tapering outward from the proximal end 21 to the distal end 22. Furthermore, in the preferred embodiment, the tool head 2 has a rectangular shape at the distal end 22. The rectangular shape is desired in order to abut flush against corners between walls and/or ceilings. Furthermore, in some embodiments, the tool head 2 is laterally symmetrical, wherein the lateral direction may be considered to be perpendicular to the rectangular cross section of the tool head 2 at the distal end 22. Furthermore, in the preferred embodiment, the tool head 2 comprises a spiderweb embellishment pattern 25 distributed across the tool head 2 between the proximal end 21 and the distal end 22.

The handle 1 is rotatably connected to the tool head 2 at the proximal end 21. The rotatable connection enables the user to position the tool head 2 at an angle relative to the handle 1 in order to adequately align the at least one adhesive layer 3 with whatever wall, ceiling or other surface the insect to be removed is positioned on. The at least one adhesive layer 3 is removably attached to the distal end 22 of the tool head 2, such that the at least one adhesive layer 3 is positioned opposite the handle 1 along the tool head 2.

Any suitable type of adhesive material may be utilized to form the at least one adhesive layer 3, though the adhesive material should not lose effectiveness over time, such as due to drying or hardening, and should have an appropriate adhesion strength—strong enough that spiders and insects will stick, but not too strong for the user to easily remove the at least one adhesive layer 3 from a surface after being applied in order to catch a spider. It should be noted that any suitable means may be utilized to affix the at least one adhesive layer 3 to the tool head 2. However, since repeated use of the at least one adhesive layer 3 to catch spiders, insects and other crawling or flying bugs is likely to gather dust and debris, reducing effectiveness of its adhesive properties, it is desirable that the at least one adhesive layer 3 be easily replaceable. To this end, in the preferred embodiment, the at least one adhesive layer 3 comprises a stack of adhesive sheets, as previously mentioned.

To that end, the preferred embodiment of the present invention further comprises an adhesive support insert 4, while the tool head 2 further comprises an insert receptacle 23. The insert receptacle 23 traverses into the tool head 2 at the distal end 22. More particularly, in the preferred embodiment, the insert receptacle 23 traverses laterally into the tool head 2. The adhesive support insert 4 comprises a body 41, a proximal surface 42, and a distal surface 43, with the body 41 of the adhesive support insert 4 extending between the proximal surface 42 and the distal surface 43 of the adhesive support insert 4. The adhesive support insert 4 is preferably generally flat and configured to be removably positioned into the insert receptacle 23, such that the at least one adhesive layer 3 is positioned opposite the tool head 2 along the adhesive support insert 4 when the adhesive support insert 4 is positioned within the insert receptacle 23. In other embodiments, different attachment means may be implemented in order to affix the adhesive support insert 4 to the tool head 2. For example, in various embodiments the adhesive support insert 4 may snap on to the distal end 22 of the tool head 2, or be attached through the use of hook and loop tape, or be attached through latches, clamps, or fasteners such as screws or nuts and bolts. However, in the preferred embodiment, the adhesive support insert 4 is slidably positioned into the insert receptacle 23. Given this arrangement, the lateral direction may now be considered to be oriented perpendicular to a sliding direction of the adhesive support insert 4 relative to the insert receptacle 23.

To this end, in the preferred embodiment, the insert receptacle 23 and the adhesive support insert 4 each comprise a pair of guide tracks 6. The pair of guide tracks 6 of the insert receptacle 23 are oriented parallel to each other and positioned laterally opposite each other along the insert receptacle 23. Similarly, the pair of guide tracks 6 of the adhesive support insert 4 are oriented parallel to each other and positioned laterally opposite each other along the adhesive support insert 4. The pair of guide tracks 6 of the adhesive support insert 4 is configured to interface with the pair of guide tracks 6 of the insert receptacle 23, such that the pair of guide tracks 6 of the adhesive support insert 4 slides along the pair of guide tracks 6 of the insert receptacle 23 while inserting or removing the adhesive support insert 4 into or from the insert receptacle 23.

In conjunction with the aforementioned sliding mechanism, the preferred embodiment further comprises a locking mechanism 5 through which the adhesive support insert 4 is releasably constrained within the insert receptacle 23. While it is contemplated that any suitable locking mechanism 5 will suffice, in the preferred embodiment the locking mechanism 5 comprises a tab 51 and a slot 52. The tab 51 is connected to the tool head 2 adjacent to the insert receptacle 23, and the slot 52 traverses into the proximal surface 42 of the adhesive support insert 4. The tab 51 is configured to be engaged into the slot 52 when the adhesive support insert 4 is positioned within the insert receptacle 23, thereby constraining the adhesive support insert 4 within the insert receptacle 23.

As previously mentioned, the handle 1 is rotatably connected to the tool head 2 at the proximal end 21 of the tool head 2. The handle 1 should be able to rotate relative to the tool head 2 to enable to user to position the tool head 2 at a proper angle relative to the handle 1 in order to press the at least one adhesive layer 3 flat against a wall, ceiling or other surface in order to capture a spider or insect. Furthermore, it is desired, though not required, that the handle 1 be adjustable in length.

In the preferred embodiment, the handle 1 comprises a handle body 11 and a joint portion 12, while the tool head 2 further comprises a joint portion 24. The joint portion 12 of the handle 1 is terminally connected to the handle body 11, and the joint portion 24 of the tool head 2 is centrally positioned on the tool head 2 at the proximal end 21. The joint portion 12 of the handle 1 is thus rotatably connected to the joint portion 24 of the tool head 2. The joint between the handle 1 and the tool head 2 should be tight enough to prevent unintended adjustments, but loose enough for the user to manually position the tool head 2 of the device to their liking. It may be desirable to integrate a locking mechanism 5 into the joint to lock the tool head 2 in place when in use. Furthermore, in some embodiments, the handle 1 may be removable from the tool head 2. In case the handle 1 or tool head 2 become damaged, either one may be separated from the assembly and replaced. A push button mechanism similar to the push-release mechanism commonly used on crutches may be added to the current configuration. With the push button mechanism, the user will be able to lock the head in various positions, preventing any unwanted movements and adjustments In various embodiments, the joint between the handle 1 and the tool head 2 may vary. In the preferred embodiment, the joint portion 12 of the handle 1 is a ball, and the joint portion 24 of the tool head 2 is a socket, forming a ball-and-socket joint. In other embodiments, different rotatable joints may be used; for example, a simple hinge joint. It is understood that there are many variations of pivoting handle 1 configurations that can be used on the device without departing from the scope of the invention Although the invention has been explained in relation to its preferred embodiment, it is to be understood that many other possible modifications and variations can be made without departing from the spirit and scope of the invention as hereinafter claimed.

What is claimed is:

1. An insect catching tool comprises:
a handle;
a tool head;
at least one adhesive layer;
the tool head comprises an insert receptacle, a proximal end and a distal end;
the tool head extending between the proximal end and the distal end;
the handle being rotatably connected to the tool head at the proximal end; and
the at least one adhesive layer being removably attached to the distal end of the tool head, wherein the at least one adhesive layer is positioned opposite the handle along the tool head;
an adhesive support insert;
the insert receptacle traversing into the tool head at the distal end;
the adhesive support insert comprises a body, a proximal surface, and a distal surface;
the body of the adhesive support insert extending between the proximal surface and the distal surface of the adhesive support insert;
the adhesive support insert being removably positioned into the insert receptacle, wherein the at least one adhesive layer is positioned opposite the tool head along the adhesive support insert when the adhesive support insert is positioned within the insert receptacle;
the adhesive support insert being slidably positioned into the insert receptacle;
a locking mechanism; and
the adhesive support insert being releasably constrained within the insert receptacle through the locking mechanism;
the locking mechanism comprises a tab and a slot;
the tab being connected to the tool head adjacent to the insert receptacle;
the slot traversing into the proximal surface of the adhesive support insert; and
the tab being configured to be engaged into the slot when the adhesive support insert is positioned within the insert receptacle.

2. The insect catching tool as claimed in claim 1 comprises:
the insert receptacle laterally traversing into the tool head.

3. The insect catching tool as claimed in claim 1 comprises:
the insert receptacle and the adhesive support insert each comprise a pair of guide tracks;
the pair of guide tracks of the insert receptacle being oriented parallel to each other and positioned opposite each other along the insert receptacle;
the pair of guide tracks of the adhesive support insert being oriented parallel to each other and positioned opposite each other along the adhesive support insert; and
the pair of guide tracks of the adhesive support insert being configured to interface with the pair of guide tracks of the insert receptacle, wherein the pair of guide tracks of the adhesive support insert slides along the pair of guide tracks of the insert receptacle.

4. The insect catching tool as claimed in claim 1 comprises:
the handle comprises a handle body and a joint portion;
the tool head further comprises a joint portion;
the joint portion of the handle being terminally connected to the handle body;
the joint portion of the tool head being centrally positioned on the tool head at the proximal end; and
the joint portion of the handle being rotatably connected to the joint portion of the tool head.

5. The insect catching tool as claimed in claim 4 comprises:
the joint portion of the handle being a ball; and
the joint portion of the tool head being a socket.

6. The insect catching tool as claimed in claim 1 comprises:
the tool head having a rectangular shape at the distal end.

7. The insect catching tool as claimed in claim 1 comprises:
the tool head being laterally symmetrical, wherein a lateral direction is oriented perpendicular to a sliding direction of the adhesive support insert relative to the insert receptacle.

8. The insect catching tool as claimed in claim 1 comprises:
the tool head being tapered outward from the proximal end to the distal end.

9. The insect catching tool as claimed in claim 1 comprises:
the tool head comprises a spiderweb embellishment pattern; and
the spiderweb embellishment pattern being distributed across the tool head between the proximal end and the distal end.

* * * * *